Patented Apr. 22, 1924.

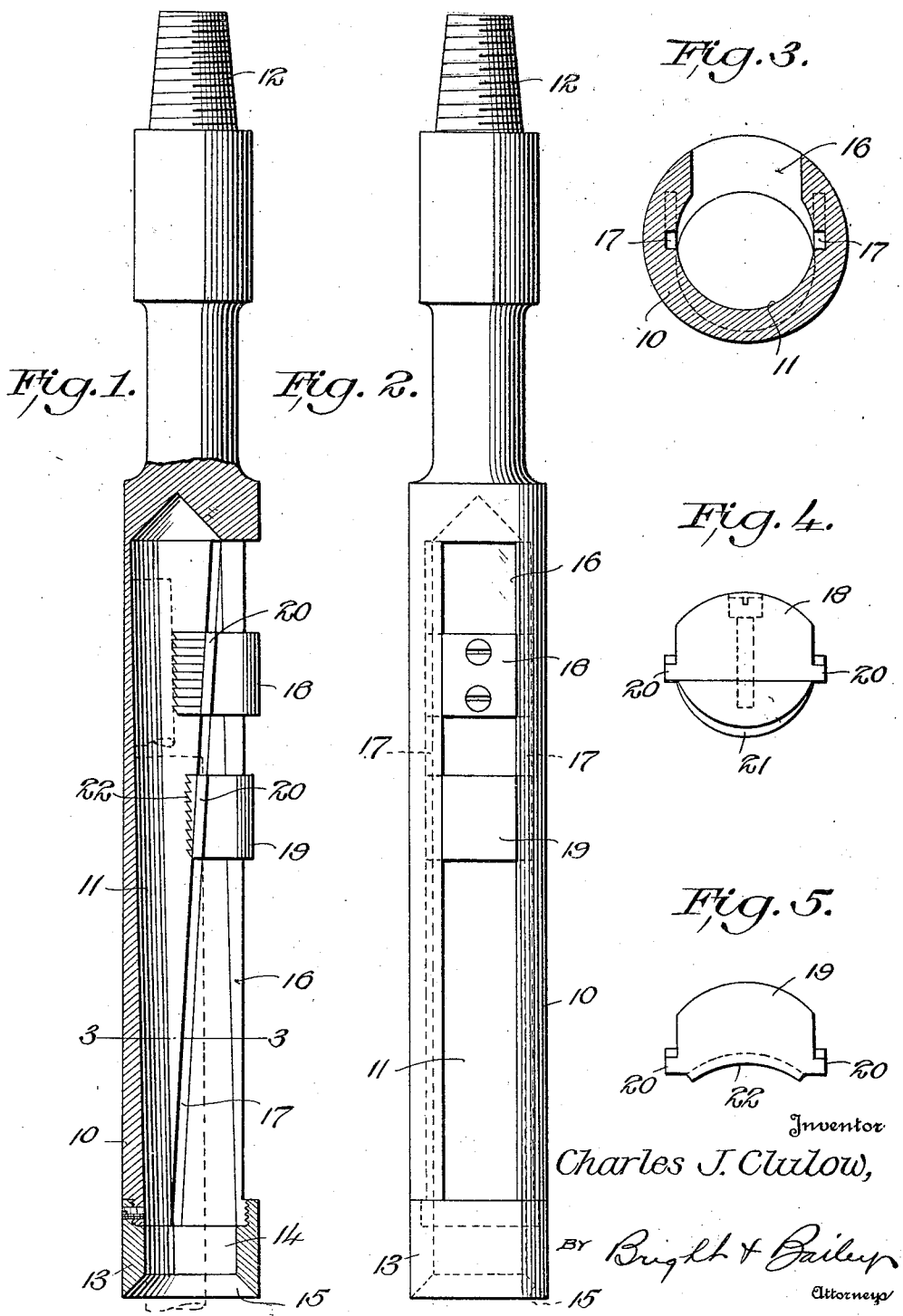

1,491,463

UNITED STATES PATENT OFFICE.

CHARLES J. CLULOW, OF TULSA, OKLAHOMA.

FISHING TOOL.

Application filed January 24, 1923. Serial No. 614,700.

*To all whom it may concern:*

Be it known that I, CHARLES J. CLULOW, a citizen of the United States, and a resident of Tulsa, in the county of Tulsa and State of Oklahoma, have invented certain new and useful Improvements in Fishing Tools, of which the following is a specification.

My invention relates to fishing tools, and has particular reference to improvements in tools for use in gripping and pulling broken tubing and sucker rods from oil or like deep wells.

The purpose of my invention, generally speaking, is to provide a fishing tool of the kind mentioned that is simple and sturdy in construction, cheap and easy to produce and thoroughly reliable and efficient in use.

More particularly it is my purpose to provide a fishing tool consisting of a socket member and a plurality of gripping devices so constructed and relatively arranged as to be capable of engagement with tubing or sucker rods of maximum as well as minimum diameters; that is entirely automatic in its gripping operation, and in which the gripping devices are operatively disposed within the socket member and maintained against accidental displacement therefrom, yet are readily removable for cleaning or repair purposes.

With the foregoing and other purposes in view, my invention consists in the novel features of construction, combination and arrangement of parts as will be hereinafter more fully described, illustrated in the accompanying drawings and defined in the appended claims.

In the drawings wherein like characters of reference denote corresponding parts in the different views—

Figure 1 is a vertical section through a fishing tool embodying the novel and essential features of my invention;

Figure 2, an elevation of our improved fishing tool;

Figure 3, a transverse section through the socket member;

Figure 4, an end elevation of one of the gripping devices; and

Figure 5, an end elevation of another gripping device.

Referring now to the drawings in detail, 10 designates an elongated cylindrical socket member that is provided with a bore 11 of extensive depth opening through its lower end, and that at its upper end is provided with a reduced threaded portion 12 or otherwise suitably formed for engagement with a rod or other device for lowering and raising the same into and from a well casing.

Threaded on the lower end of the socket 10 or detachably connected therewith in any suitable manner is a member 13 that is provided with a bore 14 that is disposed in alinement with a bore 11 and that is flared as at 15 whereby the upper end of a tube or sucker rod is guided into the bore 11 when the socket is lowered into a well.

For a purpose that will appear hereinafter, the bore 11 extends into the socket member 10 at an angle with respect to the longitudinal axis of said socket member, and as shown said bore throughout its extent opens through one side of the socket member as indicated at 16.

Formed in the wall defining the bore 11 is a pair of grooves or channels 17, 17 that are oppositely disposed and that extend throughout the depth of said bore as shown. These channels or grooves diverge inwardly with respect to the bore 11 towards the open side 16 of the socket, so that a plurality of gripping devices that are disposed within the bore 11 and guided in said grooves, will, when moved downwardly, approach the wall of the bore diametrically opposite the opening 16 and will recede from said wall when moved upwardly.

Two gripping devices are shown in the present instance and are indicated, respectively, at 18 and 19. It is to be understood, however, that the number of gripping devices is optional and that the formation of their gripping surfaces may be modified as desired. As shown, each gripping device consists of a block having lugs 20, 20 that slidably fit the respective grooves 17, 17. The upper of these blocks, 18, has a toothed gripping surface 21 that is convexed, while the lower block, 19, has a similar gripping surface 22 that is concaved. These blocks initially are inserted in the bore 11 through its lower open end when the member 13 is removed, after which the member is threaded onto the socket thereby to prevent their accidental removal or loss.

From the foregoing description considered in connection with the accompanying drawings, it is apparent that when the tool is lowered into a well casing for the purpose of gripping and removing a broken tube or sucker rod, the flared end of the member 13 will cause the upper end of such tube or rod to be guided into the bore 11, where it will engage under and lift one or both devices 18 and 19 with respect to the socket as the lowering of the latter continues, until the gripping surface of one or both of the gripping devices has receded from the wall of the bore opposite the opening 16 sufficiently to allow the tube or rod to pass between said wall and said device or devices, whereupon upward movement of the socket will cause the gripping devices to wedge against the tube or rod, thereby to lock the same to the socket, so that as the latter is raised, the tube or rod also will be raised. By having a plurality of gripping devices, respectively provided with concave and convex gripping surfaces, it is manifest that a rod too small in diameter to be gripped by a concave gripping member will be gripped by a convex gripping member, and vice versa, a tube too large to be gripped by a convex gripping member will be gripped by a concave gripping member. Thus practically any size of tube or rod may be gripped and removed by the one fishing tool.

By forming the bore 11 at an angle to the axis of the socket member 10, it is manifest that when the gripping devices are disposed at their uppermost limit of travel, their gripping surfaces will be disposed farther from the rear wall of the bore 11 than would be the case if the bore were formed coincident with the axis of the socket. Therefore, this angular disposition of the bore permits the use of my device upon tubes and rods of maximum diameter.

While I have herein shown and described one specific embodiment of my invention, it is obvious that various changes and desirable additions may be made in and to the same within its spirit and scope as defined in the appended claims.

I claim:—

1. A fishing tool comprising a socket member having a longitudinal bore, the wall defining said bore having a pair of grooves formed therein that extend in an upwardly diverging relation to said bore, and a gripping device guided by said grooves and having a surface cooperating with one side of said bore to clamp a tube or rod therein.

2. A fishing tool comprising a socket member having a longitudinal bore extending at an angle to the axis of said member, grooves formed in the wall defining said bore and extending in upwardly diverging relation to said bore, and a gripping device guided by said grooves and having a surface cooperating with one side of said bore to clamp a tube or rod therein.

3. A fishing tool comprising a socket member having a bore opening through its lower end, gripping devices slidably arranged within said bore, and a member detachably secured to the lower end of said socket and serving to retain the gripping devices within the bore thereof.

4. A fishing tool comprising a socket member having a longitudinal bore, grooves formed in the wall defining said bore and extending in upwardly diverging relation to said bore, and a plurality of gripping devices slidably engaged with said grooves, one of said gripping devices having a convex gripping surface and another having a concave gripping surface.

In testimony whereof I hereunto affix my signature.

CHARLES J. CLULOW.